US010717233B1

(12) United States Patent
Bulard

(10) Patent No.: US 10,717,233 B1
(45) Date of Patent: Jul. 21, 2020

(54) SUBSTRATE ASSEMBLY FOR 3D PRINTING SYSTEM

(71) Applicant: Park Dental Research Corporation, Ardmore, OK (US)

(72) Inventor: Ronald A Bulard, Ardmore, OK (US)

(73) Assignee: Park Dental Research Corporation, Ardmore, OK (US)

( * ) Notice: Subject to any disclaimer, the term of this patent is extended or adjusted under 35 U.S.C. 154(b) by 0 days.

(21) Appl. No.: 15/203,772

(22) Filed: Jul. 6, 2016

Related U.S. Application Data

(60) Provisional application No. 62/189,171, filed on Jul. 6, 2015.

(51) Int. Cl.
*B29C 64/245* (2017.01)
*B33Y 10/00* (2015.01)
*B33Y 30/00* (2015.01)
*B29C 64/124* (2017.01)

(52) U.S. Cl.
CPC .......... *B29C 64/245* (2017.08); *B29C 64/124* (2017.08); *B33Y 10/00* (2014.12); *B33Y 30/00* (2014.12)

(58) Field of Classification Search
CPC ....... B29C 64/10; B29C 64/106; B29C 64/20; B29C 64/205; B29C 64/223; B29C 64/245; B29C 64/386; B29C 64/393; B33Y 10/00; B33Y 30/00; B33Y 50/02
USPC .............. 425/174.4, 375; 264/401
See application file for complete search history.

(56) References Cited

U.S. PATENT DOCUMENTS

| 8,502,060 B2 * | 8/2013 | Ribner | G10G 7/02 |
| | | | 84/454 |
| 2003/0043360 A1 * | 3/2003 | Farnworth | G03F 7/0037 |
| | | | 355/77 |
| 2011/0089610 A1 * | 4/2011 | El-Siblani | B29O 33/44 |
| | | | 264/401 |
| 2016/0325493 A1 * | 11/2016 | DeSimone | B29C 33/3835 |

OTHER PUBLICATIONS

"Change and Tune Timpani Heads—Part 3: Timpani Head Installation & Tuning" (YouTube video, https://www.youtube.com/watch?v=3EO7t23Y2pM, accessed Aug. 26, 2019, published Oct. 11, 2011) (Year: 2011).*

* cited by examiner

*Primary Examiner* — Joseph S Del Sole
*Assistant Examiner* — Lawrence D. Hohenbrink, Jr.
(74) *Attorney, Agent, or Firm* — Derrick Harvey; Harvey Law

(57) ABSTRACT

The invention comprises an improved 3D object printer for building three dimensional products for multiple industries, including dental fields like orthodontic tooth aligners, drill guides, castable parts, partial dentures, and prosthetic models. The invention further comprises an improved 3D object printer that builds products using an improved, dynamic substrate base. The invention even further comprises a substrate assembly that is customizeable to build from a database of printed object profiles.

13 Claims, 8 Drawing Sheets

SUBSTRATE ASSEMBLY FOR 3D PRINTING SYSTEM

BACKGROUND OF THE INVENTION

The invention comprises an improved 3D object printer for building three dimensional products for multiple industries, including dental fields like orthodontic tooth aligners, drill guides, castable parts, partial dentures, and prosthetic models. The invention further comprises an improved 3D object printer that builds products using an improved, dynamic substrate base. The invention even further comprises a substrate assembly that is customizeable to build from a database of printed object profiles.

1. FIELD OF THE INVENTION

The present invention relates to three dimensional printing systems that cure resins to build, level by level, a three dimensional object product. The present invention further relates to the base against which 3D object products are printed. The present invention even further relates to a system of dynamic substrates customized to the best suit the object product and its functionality.

2. DESCRIPTION OF RELATED ART

There are a multitude of 3D printing systems described in the arts, sold on the marketplace, and claimed in patents. Many of them build objects upon a solid surface that is disposed horizontally, or perpendicular to gravity. This allows object products to be built either on the underside of the solid surface, or upon the top side of the surface. In either respect, the object products are built under the surface of a resin pool, where the substrate is submerged.

A solid surface is typically used to create solid substrate for the initial layer(s) of the object product to be printed in the precise position as programmed by the software inputed by the user. Deviation from the initial starting position of the object product may introduce further errors that compromise its critical dimensions, transitions between different aspects of the object product, and its ultimate suitability. Given the time it takes to print a 3D object product and the cost of resin, the arts are consistent in providing a solid substrate that comprises glass or other solid materials. Though a layer of interface material may be utilized by in some solutions in the arts, it is only in conjunction with a hard substrate as described above.

Furthermore, improvements in the substrate assembly are lacking in general in setting a horizon or zero level for the object product to begin printing. Even if the substrate is correctly aligned, the assembly that supports it can affect the horizon or zero level if the substrate has a lifting mechanism to allow access to the finished product. For those 3D object printing systems that do not have the ability to move the substrate, the user must drain the resin bin in order to access the final object product, wasting large amounts of otherwise reusable liquid state resin.

There remains a solution for a 3D object printing system that improves the substrate system to improve aligning the starting point or zero level of the to-be printed object product. There further remains a solution for the substrate to enable easier removal of the object product without draining the resin from the resin bin. There even further remains a substrate that may be dynamic in the force applied to the object product, optionally changing the qualities of the object product according to customized profiles.

SUMMARY OF THE INVENTION

These and other objects were met with the present invention. The present invention provides a substrate system assembly that provides consistent alignment at a starting position or zero level of the object product build. The present invention further provides a substrate system that improves the removal of the object product. The present invention even further provides a substrate system that reduces resin bubbles for object products being built on the underside of a substrate or base plate. The present invention even further provides a substrate that has a dynamic system of tautness that may be customized to the type of object product to be 3D printed.

Thus, a first embodiment of the present invention may comprise a:

A dynamic substrate assembly for use with a 3D object printing system, the assembly comprising a first substrate frame and a second substrate frame between which a stretchable substrate material may be placed in a substantially parallel relationship with the first substrate frame and second substrate frame, a first element that may advance through at least one of the first substrate frame and the second substrate frame to interact with the substrate material, the advancing and retraction of the first element having the effect of changing the tautness of the substrate material to a desirable level. The first element may comprise a first set of screws. The substrate assembly in may further comprise a main frame that may connect to the first or second substrate frame, the main frame comprising a pivot bracket for connecting to a build plate assembly of a 3D object printer, wherein the substrate frames may move from a closed position parallel to the resin layer to an open position where excess resin may drip back into a resin basin of the 3D object printer. The main frame may further comprise a second set of screws that bind the first substrate frame to the main frame. The substrate material may further comprise pre-cut holes corresponding to the first set of screws. The first embodiment may further comprise a calibrating apparatus for use with the substrate assembly while engaging the substrate material to create a produced tone based upon a tautness of the substrate material, the apparatus comprising a receiver for inputting the produced tone of the substrate material, a database of desired tones, a processor for comparing the produced tone against a desired tone, a tuning mechanism that advances and retracts the first element, whereas the apparatus may enable matching the tautness of the substrate to a predetermined level of tautness as evidenced by the desired tone that results from the engaged substrate material.

A second embodiment of the invention may comprise: a three dimensional printing chamber utilizing resin to build object products one layer at a time, the chamber including a resin compartment having sidewalls that define a resin basin for storing resin at a constant level while building an object product, a bulb that emits a UV light to cure resin into a layer of the object product, a first substrate frame and a second substrate frame between which a substrate material may be placed, a set of connecting elements to bind the a first substrate frame against the second substrate frame, the advancing or retracting of which tightens or loosens the substrate material to a desirable tautness, a main frame that may connect to the substrate frames, the main frame having a first side and a second side, the first side comprising a pivot bracket that allows the main frame and substrate frames to move from a closed position parallel to the resin layer to an open position where object products may be removed and excess resin may drip from the second side of the main frame back towards the first side and into the resin compartment. The printing chamber may further comprise a seating mechanism located at the second side of the main frame and a complementary position about the sidewalls of the resin basin, the seating mechanism having a first portion affixed to the complementary position about the sidewalls and second portion at the second side of the main frame so that in the closed position the first portion meets the second portion in a secure and releaseable engagement. The first portion or the second portion may resemble a spheroid. The three dimensional printing chamber may further comprise a tuning mechanism to enable matching the desirable level of tautness of the substrate material to a preset database of customized tones. The connecting elements may comprise a set of torque screws. The main frame at the second side may move from a closed position to an open position in a radial trajectory while the first side of the main frame remains at the pivot bracket. The tuning mechanism in Claim 11 may further comprising an implement used to strike the substrate material to produce a tone.

In a third embodiment of the invention, a method for calibrating a substrate material used to build 3D objects in a 3D object printing system is disclosed, the method comprising engaging a substrate material having a tautness that is captured within a frame in a fixed position to produce an original tone, comparing the original tone to preset tones that are customized to build selectable object profiles, adjusting the substrate material to increase or decrease the tautness, engaging the substrate material to produce an adjusted tone that matches the desired preset tone. The step of engaging the substrate material may further comprise striking the substrate material with an implement.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF THE INVENTION

The present invention is depicted in FIGS as a 3D stereolithographic printing system that may quickly print high resolution products using Micra SLA, UV/DLP technology that cures plastic resins ranging from 50 to 100 microns. In other embodiments, the ranges may be greater. The system may use file inputs such as .stl/.obj/.3ds/.amf, others known in the arts to print in resolutions that may reach over 32 million dots per cubic inch.

The system may comprise a vacuum sealed oxygen free chamber with a resin tray that includes three compartments, as depicted in FIGS: a resin compartment, a displacement compartment and a heater bed compartment.

First, the resin tray may include a resin compartment may store the resin. Second, a displacement compartment may include a plunger that raises and lowers the level of the resign. The displacement compartment may communicate with a laser of the system. Third, a heater bed may be positioned at the bottom of the tray that may heat the resin to an optimal temperature to build the object product.

The laser may be used to measure a height of the resin level and to generate a height data. The height data may be quickly transmitted to the OS to start, stop or continue building a level of the object. The system may comprise a vacuum sealed oxygen free chamber with a resin tray that includes three compartments: a resin compartment, a displacement compartment and a heater bed compartment.

Figure 1:
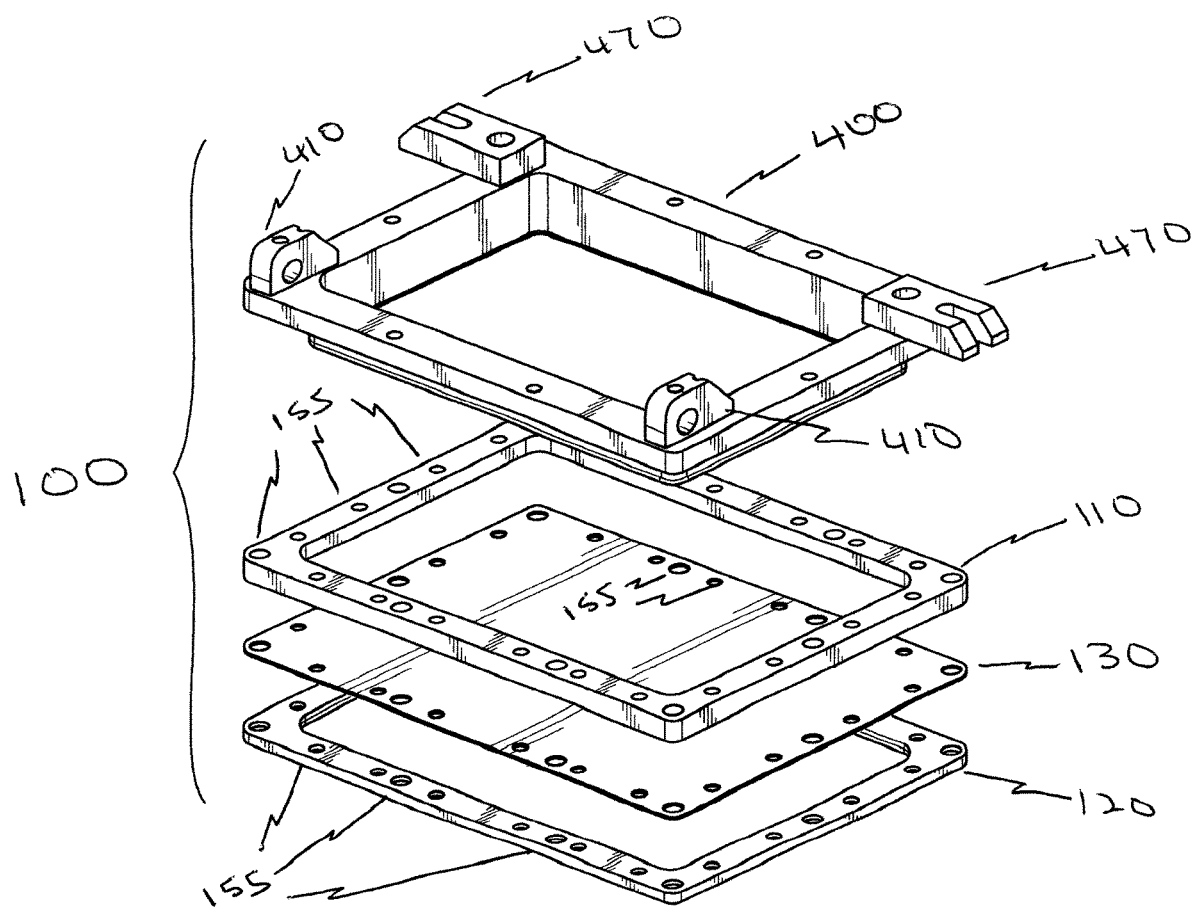
FIG. 1 is a perspective view of the inventive substrate assembly in an exploded view.
Figure 2:
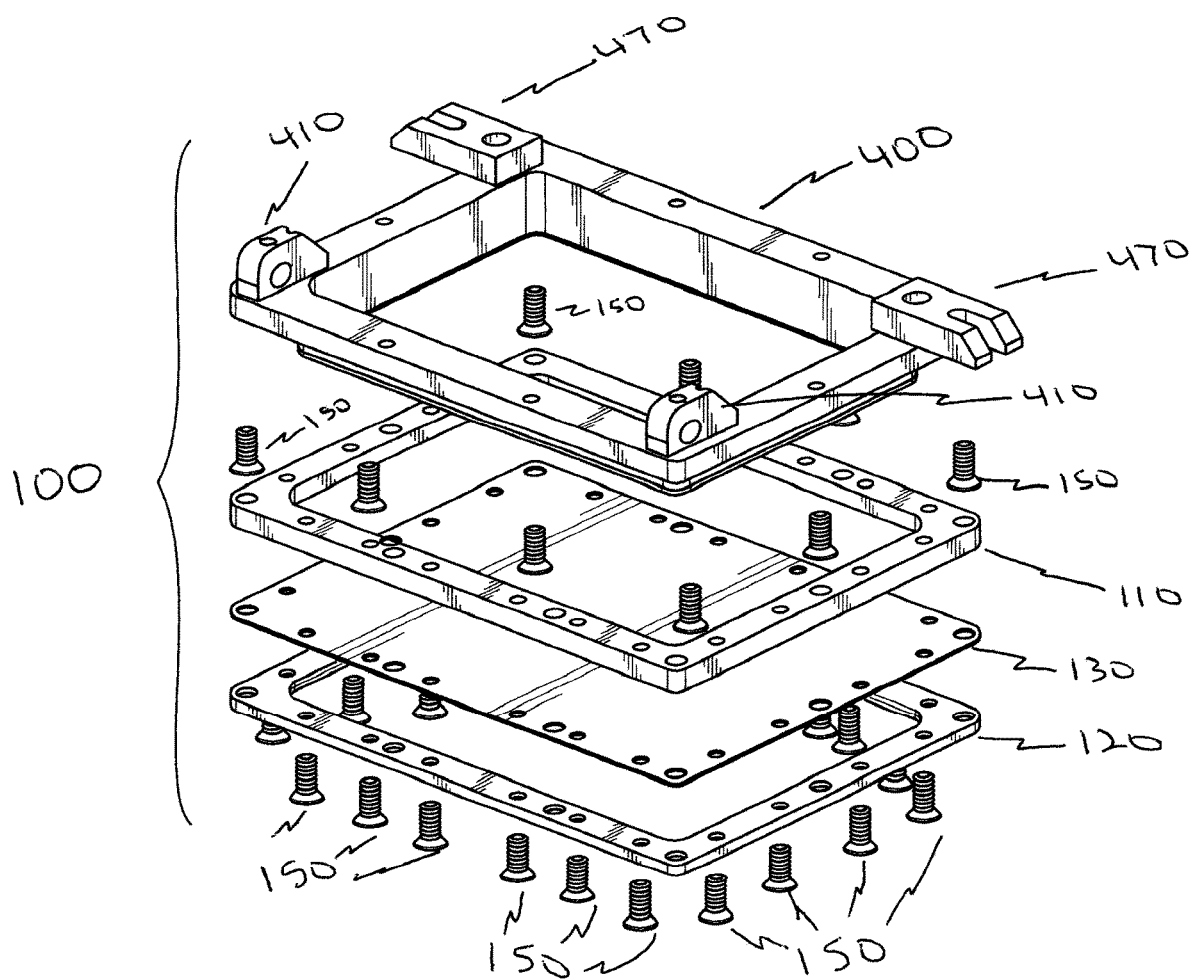
FIG. 2 is a perspective view of the inventive substrate assembly indicating where bolts secure the substrate to the brackets.
Figure 3:
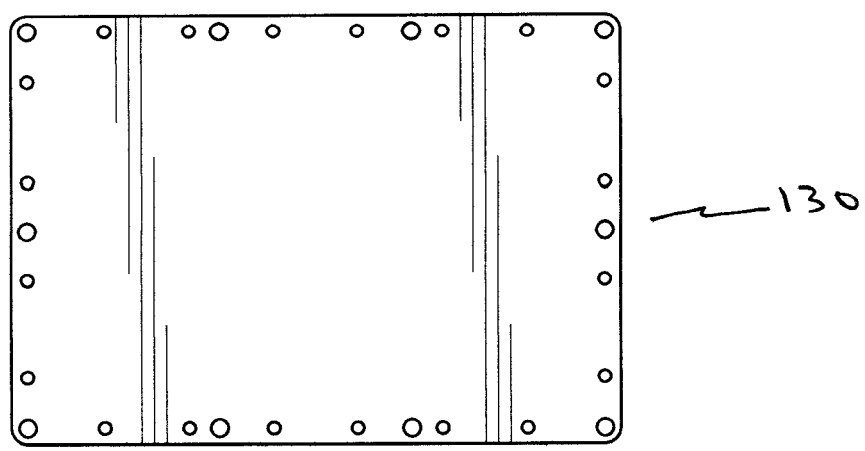
FIG. 3 is a top plan view of the inventive substrate.
Figure 4:
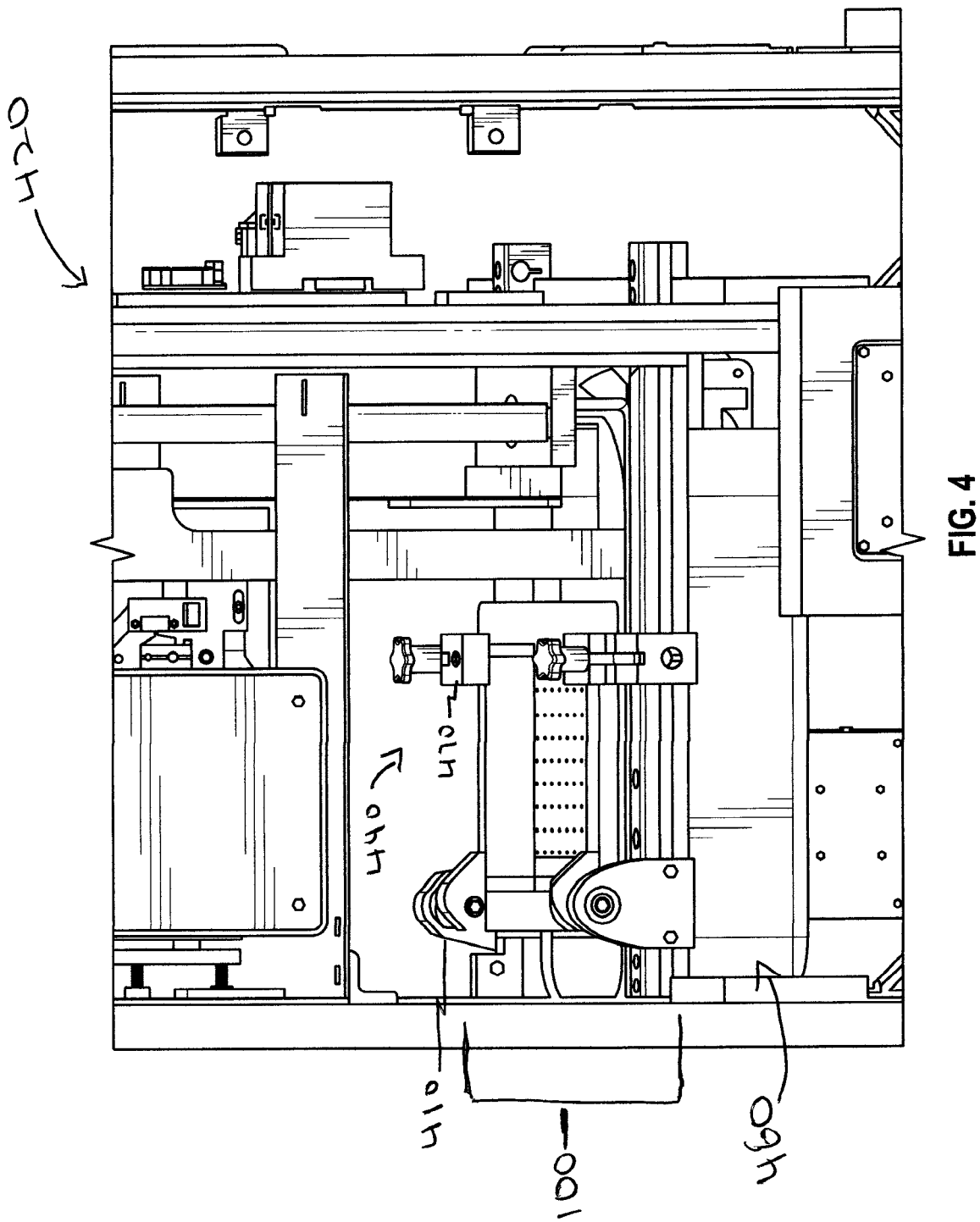
FIG. 4 is a side perspective view of the substrate assembly in build position as it relates to a greater 3D object printing system.
Figure 5:
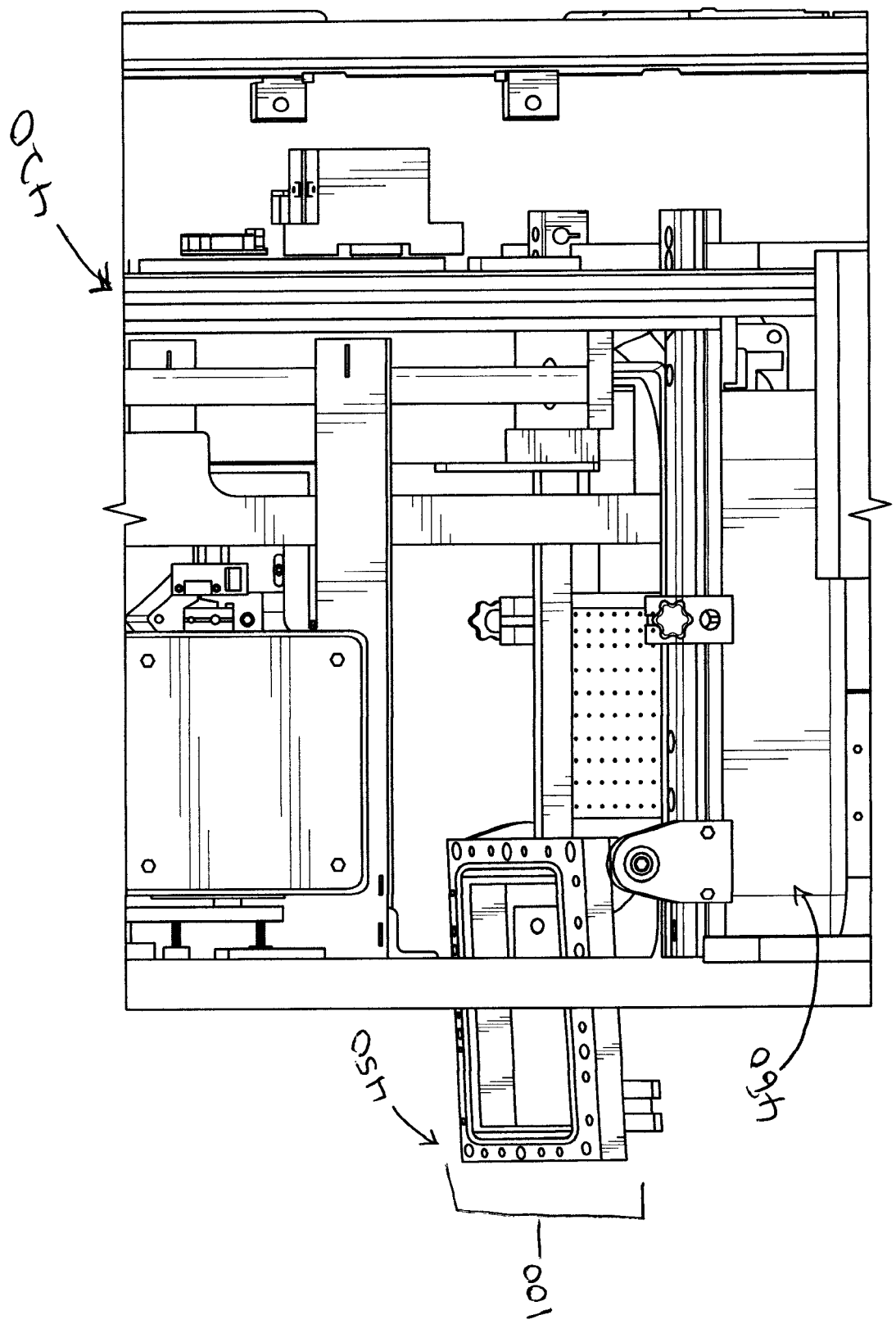
FIG. 5 is a side perspective view of the substrate assembly in extraction position.

In an embodiment of the invention, a substrate base assembly 100 is depicted in FIGS. 1-3 in isolated views, and then illustrated as part of a 3D object printing system 420 in FIG. 4-8. Looking closer at FIGS. 1-3 the substrate assembly of the invention may comprise at least one substrate frame 110, 120 that may comprise at least one bolt hole 155 therethrough and, as shown in FIGS. 1-2, two substrate frames 110, 120 with a plurality of bolt holes 155. It may further comprise a substrate base 130, shown in FIG. 3, the base which may be selected from materials that may be stretched to some degree while holding a fairly consistent tautness across the substrate base 130. By way of example and not limitation, materials and flat sheet-like products created through PTFE type formulas have characteristics that are desirable in the present invention. In addition, such materials may not stick to the object products produced by resins known in the arts of 3D printing system.

As shown, the substrate 130 may be extend across the first substrate frame 110 and a second substrate frame 120, so that the perimeters of the first and second substrate frames 110, 120 capture and hold the substrate 130 at a tension that may support the object product being built while retaining a thickness that allows passage of UV light to cure the resin into the object product. For example, it was noted that a material thickness of the base ranging from 10 microns to 500 microns would enable many object products to be printed upon the substrate base. As depicted in the FIGS, the substrate assembly 100 may have a main frame 400 that may communicate with the substrate frames 110, 120 and bases 130, as well as interact with the 3D printing assembly 420 through a pivot bracket 410 and clamp bracket 470.

Looking further at the substrate assembly, the substrate frames 110, 120 and main assembly frame 400 may be connected through a plurality of torque screws 150. In the embodiment shown in FIG. 2, two sets of torque screws 150 may be utilized to connect the substrate frames 110, 120 and to set a tension in the substrate based 130. Other embodiments of the invention may envision other means of connecting two frames and specifically, other numbers of screws by which to connect them. A first set of screws 150 compresses the two substrate frames 110, 120 upon each other. A second set of torque screws 150 may journal through a substrate frame 110, 120 and the main frame 400, the turning of which second set of torque screws 150 may pull the substrate frame 110, 120 to the main frame 400 and further stretch the substrate 130. A user may turn, or the system may be programmed to automatically turn, torque screws 150 to achieve the desired profile and tautness of the substrate base 130. In an alternative embodiment, the torque screws may also be replaced with a screw with a spring to apply a constant force on the frames against the substrate, or upon the substrate frame against the main frame. Although each set of torque are illustrated as having a listed torque value, those may be modified in value, even so the first set of torque screws may create greater torque forces than the second set of torque screws. Other torque screw profiles may be deployed well within the scope of the invention that serve to stretch the substrate to a desired level of tautness. Finally, other means to apply pressure against the substrate or uniformly stretch the substrate are well-within the scope of the invention.

In addition to its ideal thickness, the substrate base 130 may advantageously allow some flexure so that the object products may peel away from the substrate base 130 during cure levels and when pulling the substrate frames 110, 120 away from the object products and by extension, the build plates.

The taut substrate may be struck to produce a tone that registers and produces frequencies. A series of frequency standards may be utilized to create profiles favorable to different object product projects. By matching the tone produced by a taut substrate to a frequency standard, the user is assured of achieving an ideal substrate for the project as desired. In another embodiment, the 3D printing system may automatically adjust the tautness of the substrate to match a pre-determined tone or series of tones recognized by a computing machine and software that processes sounds, the predetermined tone matching an object printing profile in a database utilized by the 3D printing system or one customized by the user at the time of the tuning exercise.

A tuning receiver and system may be alternatively deployed for matching the pre-determined tone to one generated by a struck substrate. In this embodiment of the invention, a small tuning hammer may be deployed against the substrate base 130 to produce a tone, a tuning receiver may receive the produced tone and display a difference or delta between the produced tone and the desired tone, and the second set of torque screws 150 may be tightened or loosened until the produced tone matches the desired tone, which may be confirmed through subsequent produced tones.

As seen in the FIGS. 4-9 that depict the substrate window frames, the main frame 420 may connect to an axel or other pivoting apparatus that enables the substrate frames (and substrate) to pivot from a closed frame position 440 (atop and parallel with the resin level) to an open frame position 450 above the pivoting bracket 410 of the main frame 420, perpendicular to the resin level, or even at a 180 degree relationship from the closed frame position 440. The open frame position 450 of the substrate frames 110, 120 allows easy access to the built object products. In operation, the radial extraction of the substrate frames from the resin compartment provides an unexpected benefit. By pivoting the substrate frames on one side, the substrate peels away from the edge of the newly built object product towards the center, ensuring that its surface is not compromised by a more surface area-intensive extraction.

The advantages of curing resin in this respect are replete, and represent a rather "upside-down" approach to 3D printing. The resin level is controlled by the displacement of the resin at and by the substrate layer, by achieving a tautness that counteracts the buoyancy of the substrate as it is placed parallel to and slightly below the level of resin in the resin compartment 460 (in one embodiment, by 1-2 mm). In this embodiment the resin height may remain constant through the build of the object product, eliminating the need for the resin leveler to monitor and adjust for that variable. Furthermore, there is no need for a wiper to level the object products, as printed products are always at the level from the taut substrate. Finally, the idea of enabling the hinging of the frames outwardly to access the printed object products from the substrate base eliminates the need to drain resin to access products.

Furthermore, as the substrate frames are lowered into closed frame position in the resin, air is displaced. As shown in the illustration in FIGS. 6-8, a clamping bracket 470 may be deployed to releasably seat the frames 110, 120 onto the building plate mechanism or more generally, the resin compartment 460. As the substrate base 130 radially hinges back towards the resin compartment 460, it meets the resin at a first end 133 of the substrate base 130 and incrementally closes upon the resin until a second end 135 of the substrate base 130 enters the resin. The entry of the substrate based into resin from a first end 133 to a second end 135 has the effect of pushing air bubbles out from underneath the substrate base 130, resulting in a number of unexpected benefits. With less oxygen present at the building of the object product, the time to cure each layer is reduced. The object product may be exposed to fresh resin to fill on top of the object product after each layer cure, said product being flattened by the taut substrate during the cure. In sum, pressing the taut substrate upon the curing layer of the object product has the result of minimizing deformity during curing, yet the flexure of the substrate material 130 allows it to be peeled back from the object product after each curing layer is completed.

Figure 6:
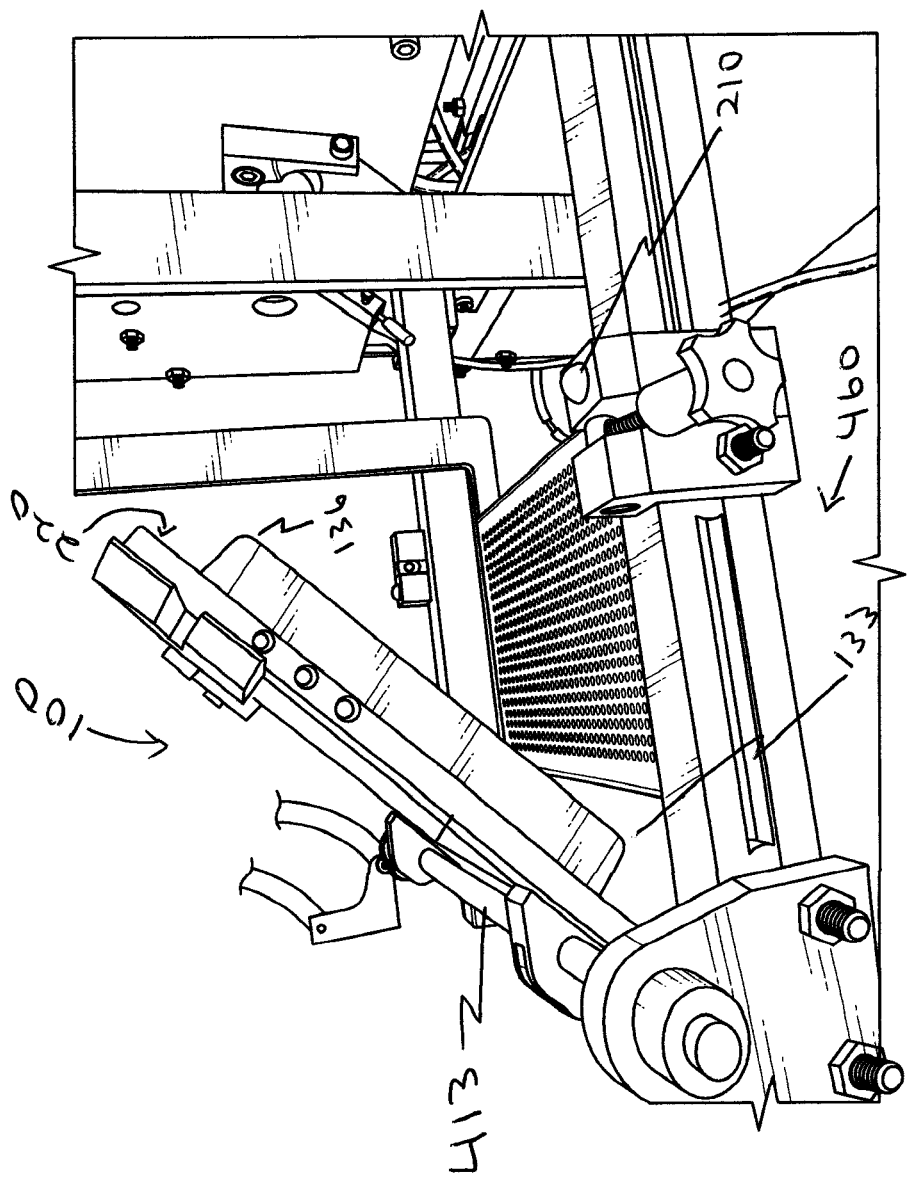
FIG. 6 is a side perspective profile of the substrate assembly as the substrate base is inclined between the extraction position and the seated position.
Figure 7:
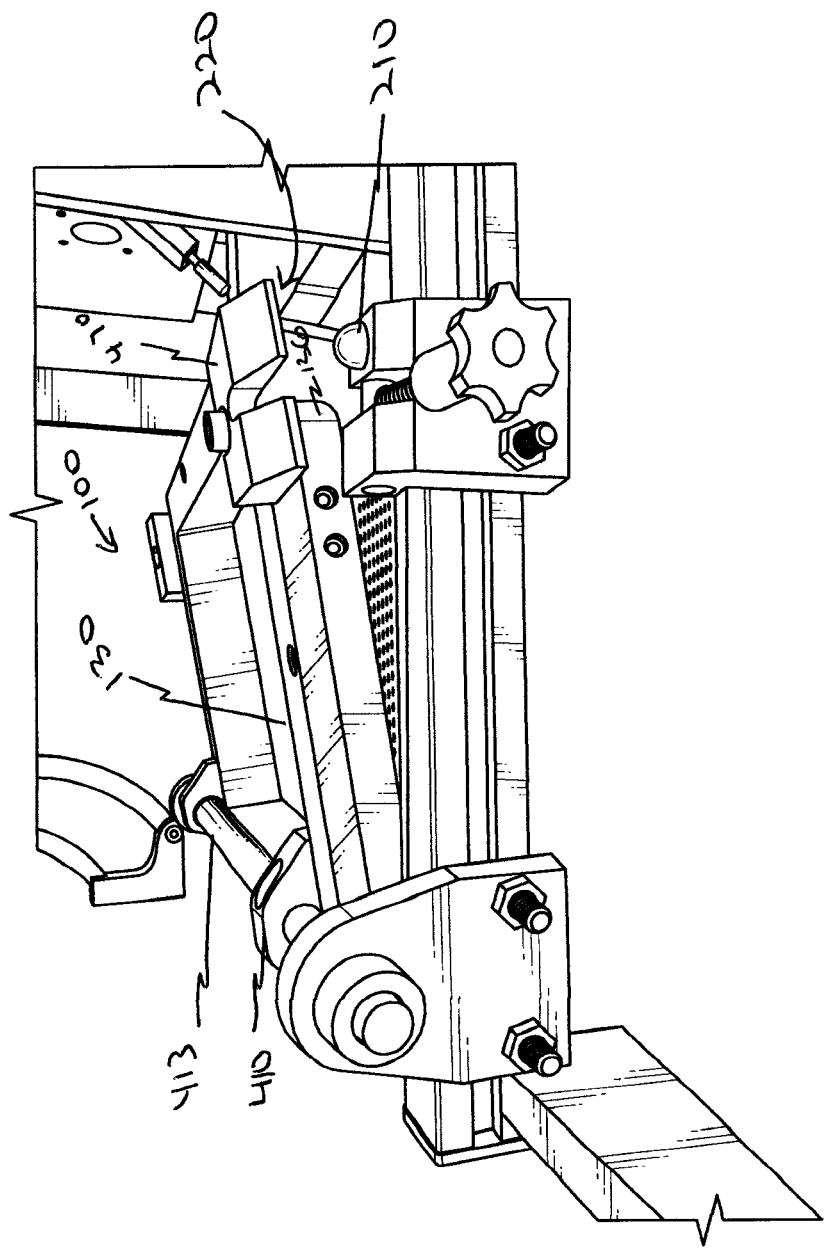
FIG. 7 is a side perspective profile of the of the substrate assembly as the substrate base approaches a seated position.
Figure 8:
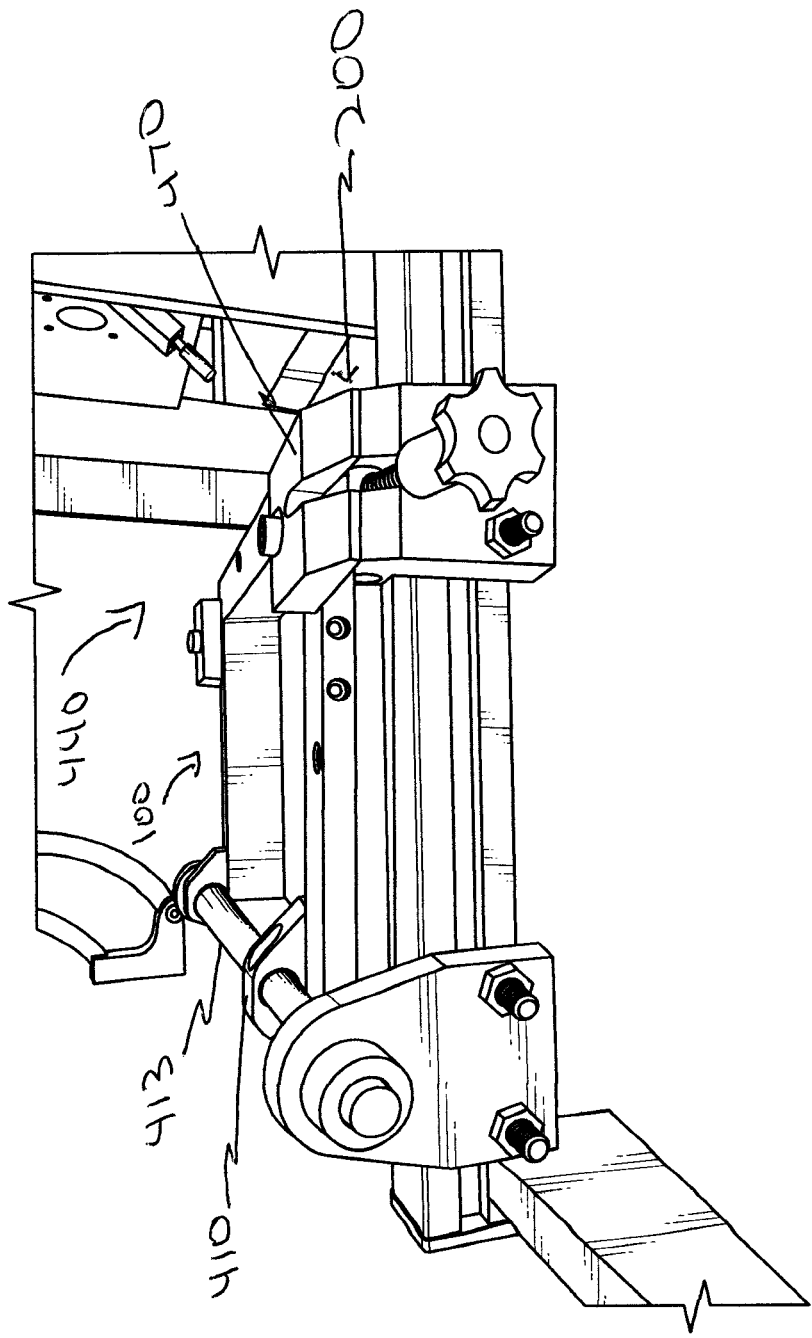
FIG. 8 is a side perspective profile of the of the substrate assembly as the substrate base a seated position.

The substrate assembly 100 may further include, as illustrated in FIGS. 6-8, a seating mechanism 200 for enabling a consistent closed position 440 of the substrate base 130 when initiating an object product building routine. The seating mechanism may comprise a male 210 and female portion 220. As shown, the male portion 210 is shown in FIGS. 6-8 as a spheroid structure positioned generally about the build plate 430 at the resin basin 460. Generally, the male portion 210 may be positioned in a fixed position from the build plate 430 or the surface of the resin in the resin basin 460, on at least two locations. The male portions 210 are illustrated as being atop two clamping brackets 470 disposed on opposite sides of the resin basin 460 structure, though they may be disposed at other locations in embodiments not shown in the illustrations. The male portions 210 may extend therethrough the clamping brackets 470 and into the side of the resign basin 460. In this embodiment, any off-set to the clamping bracket 470 will not cause a position error to the male portion 210 of the seating mechanism 200, as it will be independently mounted to the 3D printer frame. The female portion 220 of the seating mechanism 200 may be found on the main frame 400 of the seating assembly 200, or on the substrate frame(s) 110, 120 in other embodiments of the invention, resembling a complementary chamber to the male portion, so that the two portions seat as the main frame 400 hinges back towards and into the resin basin 460. In other embodiments not shown, the male portion and female portions of the seating mechanism may be switched so that the female portion is mounted to the resin basin frame and the male portion is positioned on the main frame of the substrate assembly.

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

What is claimed is:

1. A dynamic substrate assembly for use with a 3D object printing system, the assembly comprising a first substrate frame and a second substrate frame between which a stretchable substrate material may be placed in a substantially parallel relationship with the first substrate frame and second substrate frame;
   a first screw element configured to advance through at least one of the first substrate frame and the second substrate frame through the substrate material, the advancing and retraction a of the first screw element having the effect of changing the tautness of the substrate material to a desirable level.

2. The substrate assembly in claim 1, whereas the first screw element comprises a first set of screws.

3. The substrate assembly in claim 1 further comprising a main frame that may connect to the first or second substrate frame, the main frame comprising a pivot bracket for connecting to a build plate assembly of a 3D object printer, wherein the substrate frames may move from a closed position parallel to a resin to an open position where excess resin may drip back into a resin basin of the 3D object printer.

4. The substrate assembly in claim 3, the main frame further comprising a second set of screws that bind the first substrate frame to the main frame.

5. The substrate assembly in claim 2, the substrate material in claim 1 further comprising pre-cut holes configured to engage with the first set of screws.

6. A calibrating apparatus for use with the substrate assembly in claim 1 while engaging the substrate material to create a produced tone based upon a tautness of the substrate material, the apparatus comprising
   A receiver for inputting the produced tone of the substrate material;
   A database of desired tones;
   A processor for comparing the produced tone against a desired tone; and
   A tuning mechanism that advances and retracts the first screw element, whereas the apparatus may enable matching the tautness of the substrate to a pre-determined level of tautness as evidenced by the desired tone that results from the engaged substrate material.

7. A three-dimensional printing chamber utilizing resin to build object products one layer at a time, the three-dimensional printing chamber comprising:
   A resin compartment having sidewalls that define a resin basin for storing resin at a constant level while building an object product;
   a bulb that emits a UV light to cure the resin into a layer of the object product;
   a first substrate frame and a second substrate frame between which a substrate material may be placed;
   a set of screw elements to bind the first substrate frame against the second substrate frame through the substrate material, the advancing or retracting of the set of screw elements is configured to tighten or loosen the substrate material to a desirable tautness; and
   a main frame that may connect to the substrate frames, the main frame having a first side and a second side, the first side comprising a pivot bracket that allows the main frame and substrate frames to move from a closed position parallel to the resin layer to an open position where object products may be removed and excess resin may drip from the second side of the main frame back towards the first side and into the resin compartment.

8. The three-dimensional printing chamber in claim 7 further comprising a seating mechanism located at the second side of the main frame and a complementary position about the sidewalls of the resin basin, the seating mechanism having a first portion affixed to the complementary position about the sidewalls and a second portion at the second side of the main frame so that in the closed position the first portion meets the second portion in a secure and releasable engagement.

9. The three-dimensional printing chamber in claim 8, wherein the first portion or the second portion resembles a spheroid.

10. The three-dimensional printing chamber in claim 7, further comprising a tuning mechanism to enable matching the desirable tautness of the substrate material to a preset database of customized tones.

11. The three-dimensional printing chamber in claim 7, whereby the set of connecting screw elements may comprise a set of torque screws.

12. The three-dimensional printing chamber in claim 7, the main frame at the second side moving from a closed position to an open position in a radial trajectory while the first side of the main frame remains at the pivot bracket.

13. The three-dimensional printing chamber in claim 10, the tuning mechanism further comprising an implement used to strike the substrate material to produce a tone.

* * * * *